United States Patent
Krüger

(10) Patent No.: US 7,809,053 B2
(45) Date of Patent: Oct. 5, 2010

(54) DEVICE AND METHOD FOR CONTROL SCALING AND QUANTIZATION OF SOFT OUTPUT VALUES FROM AN EQUALIZER

(75) Inventor: Martin Krüger, München (DE)

(73) Assignee: Infineon Technologies AG (DE)

( * ) Notice: Subject to any disclaimer, the term of this patent is extended or adjusted under 35 U.S.C. 154(b) by 1445 days.

(21) Appl. No.: 10/957,344

(22) Filed: Oct. 1, 2004

(65) Prior Publication Data
US 2005/0111584 A1   May 26, 2005

Related U.S. Application Data

(63) Continuation of application No. PCT/DE03/000546, filed on Feb. 21, 2003.

(30) Foreign Application Priority Data
Apr. 4, 2002   (DE)   ................. 102 14 908

(51) Int. Cl.
*H03H 7/30* (2006.01)
(52) U.S. Cl. .................................. 375/229
(58) Field of Classification Search .......... 375/229, 375/232, 316, 340, 341, 230
See application file for complete search history.

(56) References Cited

U.S. PATENT DOCUMENTS

| | | | |
|---|---|---|---|
| 4,706,012 A * | 11/1987 | Kerkman et al. | 323/280 |
| 5,271,042 A | 12/1993 | Borth et al. | 375/101 |
| 5,297,166 A * | 3/1994 | Batruni | 375/233 |
| 5,550,810 A * | 8/1996 | Monogioudis et al. | 370/342 |
| 6,295,614 B1 * | 9/2001 | Peters et al. | 714/704 |
| 6,347,124 B1 | 2/2002 | Antia et al. | 375/341 |
| 2002/0067780 A1* | 6/2002 | Razzell | 375/341 |
| 2004/0240595 A1* | 12/2004 | Raphaeli | 375/350 |

FOREIGN PATENT DOCUMENTS

DE   199 43 386 A1   3/2001

OTHER PUBLICATIONS

Y.K. Lee, et al.; "Normalization, windowing and quantization of soft-decision Viterbi decoder inputs in CDMA"; Vehicular Technology Conference, pp. 221-225, May 1999.
B. Montorsi; "Design of Fixed-Point Iterative Decoders for Concatenated Codes with Interleavers"; IEEE Journal on Selected Areas in Communications, vol. 19, No. 5, pp. 871-882, May 2001.
T.W. Kwon et al.; "A Modified Two-Step Sova Based Turbo Decoder for Low Power and High Performance"; Proceedings of the IEEE Region 10 Conference; vol. 1, pp. 297-300, 1999.
Z. Wang et al.; "Efficient Approaches to Improving Performance of VLSI Sova-Based Turbo Decoders"; IEEE International Symposium on Circuits and Systems, pp. 287-290, May 2000.

* cited by examiner

*Primary Examiner*—Kevin M Burd
(74) *Attorney, Agent, or Firm*—Dickstein, Shapiro, LLP.

(57) ABSTRACT

A device for scaling and quantization of digital soft output values ($s_k$) from an equalizer has a control loop for controlling a statistical parameter ($\theta$) for the scaled and quantized soft output values ($s_{D,k}$), which contains a calculation unit (4) for calculation of the statistical parameter ($\theta$), and a control unit (5) for calculation of a scaling factor (c) for scaling the soft output values ($s_k$) from the equalizer on the basis of the statistical parameter ($\theta$).

17 Claims, 2 Drawing Sheets

DEVICE AND METHOD FOR CONTROL SCALING AND QUANTIZATION OF SOFT OUTPUT VALUES FROM AN EQUALIZER

CROSS REFERENCE TO RELATED APPLICATION

This application is a continuation of copending International Application No. PCT/DE03/00546 filed Feb. 21, 2003 which designates the United States, and claims priority to German application no. 102 14 908.9 filed Apr. 4, 2002.

TECHNICAL FIELD OF THE INVENTION

The present invention generally relates to a device and a method, by means of which controlled scaling and quantization of digital soft output values from an equalizer can be carried out.

BACKGROUND OF THE INVENTION

In mobile radio, an electromagnetic wave is applied to the antenna of the mobile radio receiver. The electromagnetic wave contains a radio-frequency signal which has been modulated by convolutional-coded information and parity bits. The antenna converts the electromagnetic wave to electrical signals. The electrical signals are converted to baseband by multiplication by coherent carriers. The radio-frequency signal is filtered out of two or more channels by means of bandpass filtering, and is selected from the time-division multiplex by time windowing. Furthermore, the radio-frequency signal is digitized during the described conversion process. An equalizer is used to estimate the transmitted channel-coded data bits $b_k$ from the received signal, and these are then decoded in a channel decoder. The equalizer and channel decoder are used to calculate out signal distortion and faulty bits which are produced in the transmitted signal during the transmission by a channel, as well as punctured bits, out of the received signal. The known Viterbi algorithm provides a powerful and widely used calculation method, which can be used both for equalization and for channel decoding.

Particularly with regard to equalization, it has been found to be advantageous to estimate error probabilities $p_k$ in addition to the equalized data bits $b_k$. Each data bit $b_k$ has an associated error probability $p_k$. The channel decoding which is carried out after the equalization process is considerably improved when using the error probabilities $p_k$.

The error probabilities $p_k$ have to be temporarily stored if they are intended to be used once again for incremental redundancy purposes in the GSM EGPRS (Enhanced General Packet Radio Service). In this case, incorrectly received data bits $b_k$ are transmitted once again with the same or different puncturing, thus increasing the redundancy.

The error probabilities $p_k$ are stored in the form of so-called soft output values $s_k$. The soft output values $s_k$ can be calculated from the error probabilities $p_k$ as follows:

$$s_k = \ln\left(\frac{1}{p_k} - 1\right) \quad (1)$$

In the situation where the equalizer cannot make any statements about the received data bit $b_k$, the error probability $p_k$ is equal to 0.5, and the associated soft output value $s_k$ is equal to 0. In the situation where the transmission conditions are good and, in consequence, the error probability $p_k$ assumes the value 0, the associated soft output value $s_k$ is infinitely large or, in an actual digital system, reaches a saturation value. In the situation where the error probability $p_k$ is greater than 0.5, the associated soft output value $s_k$ becomes negative. In this situation, it is more probable that the data bit $1-b_k$ has been transmitted, rather than the data bit $b_k$. However, this situation will not be considered in the following text.

The equalizer cannot make any statement about data bits $b_k$ which have been punctured after the convolutional coding. Before the channel decoding process, these data bits $b_k$ are each assigned a soft output value $s_k$ of 0, so that they have no significance for the channel decoder.

Channel-coded data bits $b_k$ are decoded together with their soft output values $s_k$ in the channel decoder. Without the soft output values $s_k$, the performance of the channel decoder would be greatly restricted. The decoded data bits contain a checksum word, which can be used by a consistency test to determine whether the transmitted and deconvolved data bits are error-free. If the data bits are found to be free of errors, the data block is passed on. Otherwise, a change is made to a lower-order modulation type and channel coding (MCS; Modulation and Coding Scheme), or the data block is retransmitted. The new request for the data block can also be repeated two or more times. The data bits $b_k$ which have been received two or more times and their soft output values $s_k$ are combined in a suitable manner, and are deconvolved jointly.

The memory requirement for storage of the data bits $b_k$ and of their soft output values $s_k$ is not negligible in integrated circuits. A depunctured data block comprises 1836 bits. By way of example, the memory requirement for four data blocks has approximately 60 kBits, if the number $N_{soft}$ of bits in a soft output value $s_k$ is 7. It is thus desirable to store the soft output values $s_k$ as integer soft output values $s_{D,k}$ with as short a data length as possible. In order to store the theoretically possible range from 0 to infinity as soft output values $s_{D,k}$, the soft output values $s_k$ are quantized and saturated.

However, both excessively coarse quantization and saturation quickly have a negative effect on an excessively small value range. In neither case can the channel decoder reasonably assess the quantized soft output values. If the transmission conditions are very poor, excessively coarse quantization will in some circumstances result in soft output values $s_{D,k}$ equal to 0 being applied to a large number of data bits $b_k$, and in them subsequently being rejected. If the transmission conditions are very good, saturation leads to an excessively narrow value range in which a large number, or even all, of the soft output values $s_{D,k}$ are greater than the maximum value $2^{Nsoft}-1$, so that it is no longer possible to distinguish between the error probabilities.

For optimum utilization of the numerical range predetermined by the number $N_{soft}$, it is known for the soft output values $s_k$ to be scaled by a scaling factor c before quantization, that is to say for the soft output values $s_k$ to be divided by the scaling factor c. In the GSM service EGPRS, the value range of the soft output values $s_k$, which is otherwise wide for this service, is linearly compressed. However, this results in an increase in the quantization errors.

Non-linear compression may also be used instead of linear compression. The quantization error can thus advantageously be redistributed. By way of example, the non-linear compression can be carried out in such a way that the quantization error decreases for relatively small soft output values, and increases for large soft output values. However, non-linear compression has the disadvantage that this results in the input variable to the channel decoder being subjected to non-linear distortion.

SUMMARY OF THE INVENTION

The object of the invention is thus to provide a low-complexity device for scaling and quantization of digital soft output values from an equalizer, which allows the scaled and quantized soft output values to be produced with as little error as possible and with as short a data length as possible. A further aim is to specify a corresponding method. One particular aim is for the device and the method to be usable for an EDGE (Enhanced Data Services for GSM-Evolutions) mobile radio receiver.

A device according to the invention for scaling and quantization of digital soft output values from an equalizer has a control loop which is used to control a statistical parameter for the scaled and quantized soft output values which are produced by these device. For this purpose, the control loop has a calculation unit and a control unit which is connected downstream from the calculation unit. The calculation unit uses the scaled and quantized soft output values to calculate the statistical parameter. The statistical parameter indicates a characteristic value for the statistical distribution of the scaled and quantized soft output values. The control unit then carries out the control process on the basis of the statistical parameter as the controlled variable, with a scaling factor being calculated as a manipulated variable, which determines the scaling of those soft output values in the equalizer which have not yet been scaled and quantized.

Since the scaling factor is calculated from soft output values, and the soft output values reflect the transmission quality of the radio transmission, the scaling factor is a function of the transmission quality. The scaling factor is set to be high for good transmission conditions, and is set to be low for poor transmission conditions. This is advantageous in comparison to already known scaling devices, since the soft output values can be scaled and quantized with only a small error in this way, despite the data length being as short as possible.

In comparison to non-linear compression, the invention has the further advantage that the control process according to the invention is considerably less complex than the normally highly complex non-linear arithmetic processing of the soft output values produced by the equalizer.

One preferred refinement of the invention provides for the device according to the invention to have a scaling unit which is supplied with the digital soft output values from the equalizer, and which scales these soft output values using the scaling factor. For this purpose, the scaling unit is fed with the scaling factor from the control unit, for example via a control input.

A further preferred refinement of the invention is characterized by a quantization unit which quantizes the soft output values which, for example, have been scaled by the scaling unit. Furthermore, the scaled soft output values may also, in particular, be saturated by the quantization unit. This means that the value range of the soft output values is limited to a predetermined value range. By way of example, the saturation may be carried out in such a way that scaled soft output values which are outside the predetermined value range are each set to the closer limit of the predetermined value range.

The control unit advantageously regulates the statistical parameter at a predetermined value. For this purpose, the control unit preferably has an integral regulator, or a proportional-integral regulator.

Although the control unit may be designed as described above, such that it regulates the statistical parameter at a predetermined value, it is also possible to provide for the statistical parameter to be regulated to a predetermined value range. The control unit may then, for example, be in the form of an automatic state machine, where complexity is very low. In this case, the scaling factor may assume a finite number of discrete values. Furthermore, two limit values are predetermined, which limit the permissible value range for the statistical parameter. This method of operation of an automatic state machine can be described as follows. As soon as the statistical parameter passes through one limit out of the permissible value range, the scaling factor is increased from its instantaneous value to the next higher value. As soon as the statistical parameter passes through the other limit of the permissible value range, the statistical parameter is reduced to the next smaller value.

According to one preferred refinement of the invention, the soft output values are plotted on a histogram after scaling and quantization. The calculation unit determines the statistical parameter from the histogram.

In this case, the statistical parameter may be the mean value of the scaled and quantized soft output values. Alternatively, the statistical parameter may also be the bit error probability. The bit error probability is defined as the scalar product of a vector whose components each indicate the frequency of a soft output value $s_{D,k}$ which can be determined from the histogram, and a fixed coefficient vector. A further implementation option for the statistical parameter is represented by the frequency with which the smallest and/or the largest soft output value occurs in the histogram.

The controlled and manipulated variables are preferably converted to logarithmic form in the control loop, in order to provide a linear control loop. Furthermore, the scaling factor may advantageously be quantized.

The device according to the invention is preferably implemented in a mobile radio receiver, in particular an EDGE radio receiver.

In this case, it is possible to use not only the statistical parameter but also further parameters which reflect the transmission quality in order to determine the optimum scaling factor. On the one hand, this is the signal power received by the mobile radio receiver, and on the other hand it is the amplifier setting, which is controlled by the receiver and is connected upstream of an analog/digital converter for digitization of the received signal.

Although provision is made for the received signal power and the setting of the amplifier that is connected upstream of the analog/digital converter to be used to assist the control loop in the determination of the scaling factor, it is just as feasible to use only the received signal power and/or the amplifier setting, without the control loop, for the same purpose.

The method according to the invention is used for scaling and quantization of digital soft output values which are generated by an equalizer. For this purpose, soft output values from the equalizer are scaled, quantized and, in particular, saturated. A statistical parameter which describes the statistical distribution of the scaled and quantized soft output values is then calculated. The statistical parameter is then used to calculate a scaling factor for the scaling of further soft output values which are produced by the equalizer.

The method according to the invention takes account of the transmission quality of the radio link in the calculation of the scaling factor, as a result of the use of the statistical parameter.

Furthermore, the method according to the invention can be implemented with particularly little complexity.

BRIEF DESCRIPTION OF THE DRAWINGS

The invention will be explained in more detail in the following text using exemplary embodiments and with reference to the drawings, in which.

DETAILED DESCRIPTION OF PREFERRED EMBODIMENTS

Figure 1:
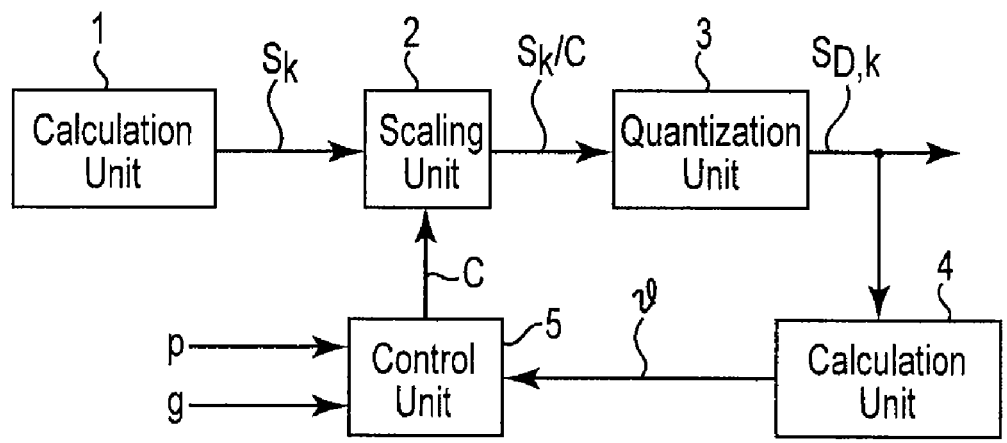
FIG. 1 shows a schematic circuit diagram of one exemplary embodiment of the device according to the invention.

FIG. 1 shows one exemplary embodiment of the device according to the invention, in schematic form. In this case, a calculation unit 1, a scaling unit 2 and a quantization unit 3 are connected one behind the other in the stated sequence in an equalizer. A control loop connects the output of the quantization unit 3 to a control input of the scaling unit 2 via a calculation unit 4 and a downstream control unit 5.

The calculation unit 1 is used to calculate soft output values $s_k$, which are each associated with an equalized data bit based on a hard decision and indicate the probability of this data bit being a 0 or a 1. In the present exemplary embodiment, the soft output values $s_k$ which are produced by the calculation unit 1 have a data length of 16 bits. The soft output values $s_k$ are supplied to the scaling unit 2, in which the soft output values $s_k$ are divided by a scaling factor c. This reduces the value range of the soft output values, and the compressed soft output values $s_k/c$ are emitted from the scaling unit 2.

Alternatively, it is also possible to provide for the soft output values $s_k$ to be multiplied by a scaling factor. This would be the inverse of the present scaling factor c. The soft output values $s_k/c$ are then quantized and saturated in the quantization unit 3. In the present case, the soft output values $s_{D,k}$ which are emitted from the quantization unit 3 have a data length of 4 bits. A further bit indicates the mathematical sign of the soft output value $s_{D,k}$. This means that the soft output values $s_{D,k}$ may assume integer values between −15 and +15.

A soft output value $s_{D,k}$ of −15 indicates the highest probability of the associated data bit assuming the value 1. Correspondingly, a soft output value $s_{D,k}$ of +15 indicates that the associated data symbol has a high probability of being 0. If the soft output value $s_{D,k}$ is 0, it is not possible to make any statement about the associated data bit.

During the quantization and saturation of the soft output values $s_k/c$, those soft output values $s_k/c$ which are outside the limits of the value range from −15 to +15 are set to the closer limit value of this value range. Those soft output values $s_k/c$ which are within the stated value range are retained in the quantization.

The calculation unit 1, the scaling unit 2 and the quantization unit 3 may also be replaced by a unit which links the functions of the three units mentioned to one another, and carries them out jointly.

The soft output values $s_{D,k}$ are plotted on a histogram in the calculation unit 4. In this case, the frequencies with which the magnitudes of the soft output values $s_{D,k}$ each assume one of the integer values from 0 to 15 are counted. A statistical parameter θ is calculated from the histogram. For example, this may be the frequency with which the value 0 or the value 15 is assumed, or may be the mean value of the soft output values $s_{D,k}$, or the bit error probability. The bit error probability is defined as the scalar product of a 16-component vector whose components each indicate the frequency of a soft output value $s_{D,k}$ which can be determined from the histogram, and a fixed coefficient vector.

The statistical parameter θ represents the controlled variable for the control unit 5. The control unit 5 uses this controlled variable as a manipulated variable to calculate the scaling factor c, which is fed to the control input at the scaling unit 2. The method of operation of the control unit 5 is described in more detail further below.

Furthermore, the signal power p received by the associated mobile radio receiver and/or the amplifier setting g which is controlled by the mobile radio receiver and is connected upstream of an analog/digital converter that is designed to digitize the received signal, may optionally also be fed into the control unit 5. These two variables may provide additional points of reference in order to make it possible to optimally set the scaling factor c. Furthermore, it is feasible for the control unit 5 to have the signal power p and/or the setting g applied to it, and for the statistical parameter θ not to be fed back to the control unit 5. In this case, the scaling factor c would be calculated solely on the basis of the signal power p and/or the setting g. However, this situation will not be considered any further in the following text.

Figure 2:
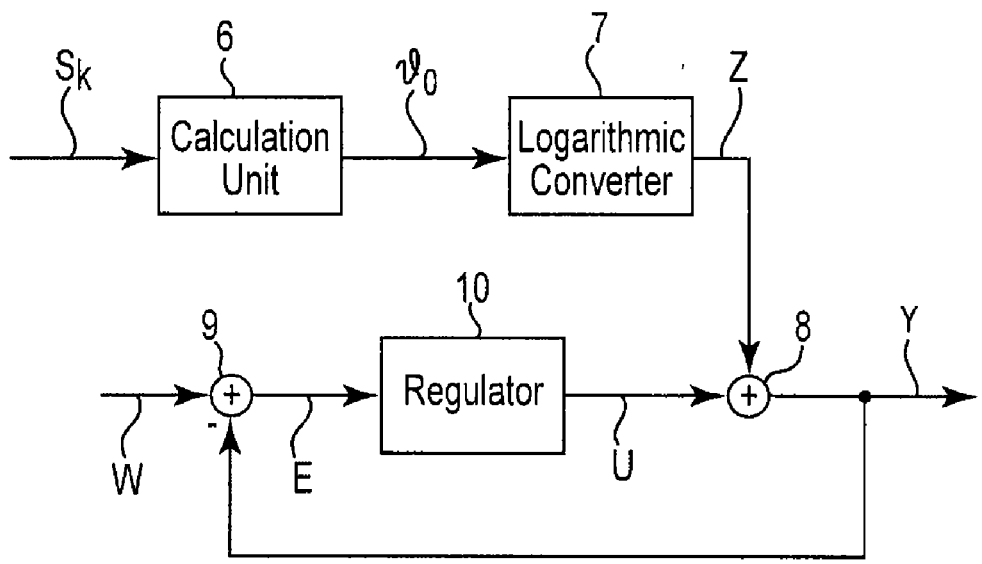
FIG. 2 shows a schematic circuit diagram of one exemplary embodiment of the control system according to the invention.

FIG. 2 shows a linear control system which can be used to implement the invention, in more detail. Soft output values $s_k$, which have not yet been scaled and quantized, are fed to a calculation unit 6, which uses them to calculate a linear statistical parameter $θ_0$. The variable Z is formed by logarithmic conversion in a logarithmic converter 7 that is connected downstream from the calculation unit 6, as follows:

$$Z = \log θ_0 = \log θ\{s_k\} \tag{2}$$

The variable Z is fed to a summation point 8, where it is added to a variable U which indicates the negative logarithm of the scaling factor c:

$$U = -\log c \tag{3}$$

This summation process produces a variable Y:

$$Y = Z + U = \log θ_0 - \log c = \log \frac{θ_0}{c} \tag{4}$$

Owing to the linearity of the statistical parameter θ which is formed from the scaled soft output values $s_{D,k}$, if the quantization and saturation are ignored, then:

$$θ(c) = θ\{s_k/c\} = θ_0/c \tag{5}$$

It follows from this that the variable Y indicates the logarithm of the statistical parameter θ of the scaled soft output values $s_{D,k}$:

$$Y = \log θ(c) = \log θ \tag{6}$$

In the present control system, the variable Y is the controlled variable, and the variable U is the manipulated variable. A variable W is the reference variable, at which the variable Y is intended to be regulated. A variable E is calculated for this purpose as the control error at a summation point 9:

$$E = W - Y \tag{7}$$

The variable E is fed to a regulator 10, which uses the control error to calculate the scaling factor c, which it emits as the variable U.

Figure 3:
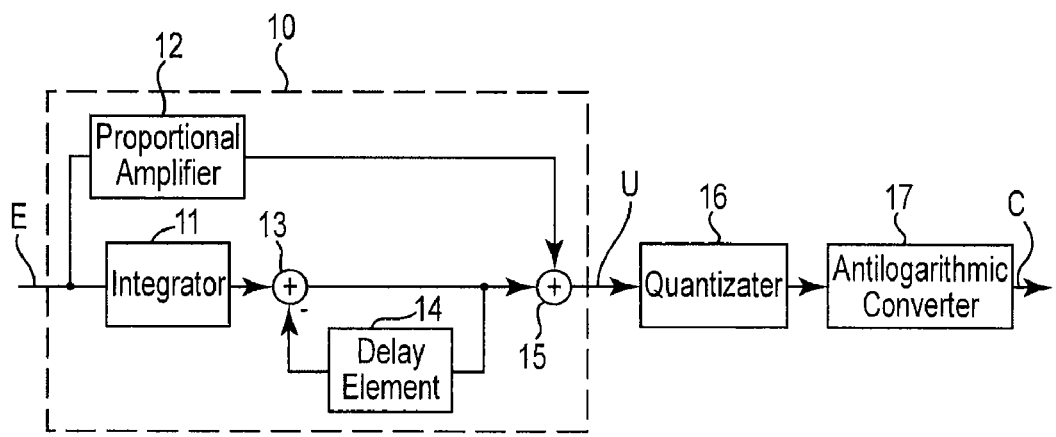
FIG. 3 shows a schematic circuit diagram of a proportional-integral regulator.

The regulator 10 may be in the form of a proportional-integral regulator, as illustrated schematically in FIG. 3. An integrator 11 and a proportional amplifier 12 are connected in parallel, and the variable E is fed to their input side. The output signals from the integrator 11 and from the proportional amplifier 12 are added at a summation point 15, thus resulting in the variable U. Furthermore, a delay element 14 is arranged in a feedback loop in the integration path, and its output signal is subtracted from the output signal in the integrator 11 by means of a summation point 13.

The variable U is quantized by means of a quantizer 16. In this case, the quantization process should include hysteresis. The variable U is then converted back from logarithmic form by means of an antilogarithmic converter 17. This results in the scaling factor c which, in the present case, assumes discrete values.

The control system illustrated in FIGS. 2 and 3 can be implemented with various variations. The logarithmic/antilogarithmic conversion described above can be saved by omission of the logarithmic converter 7 and of the antilogarithmic converter 17. In consequence, the control loop is non-linear. The regulator 10 can also be converted to an integral regulator by omission of the proportion amplifier 12. Furthermore, the quantizer 16 may also be saved, with the consequence that the scaling factor c assumes continuous values.

Figure 4:
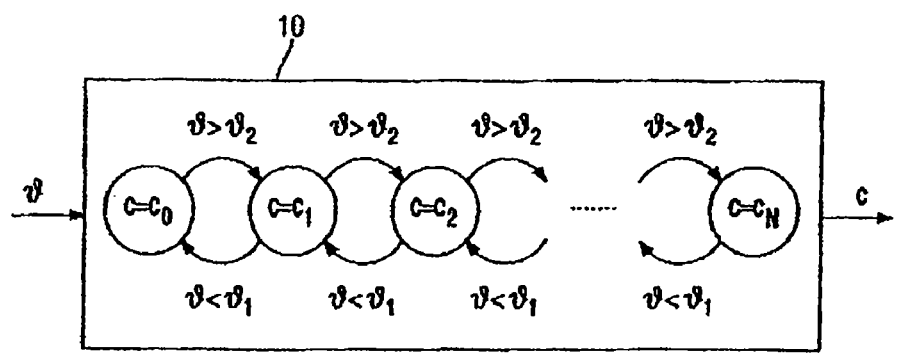
FIG. 4 shows a schematic illustration of an automatic state machine.

FIG. 4 illustrates a further exemplary embodiment of the regulator 10 in schematic form. In this case, the regulator 10 is in the form of an automatic state machine. The regulator 10 in the present case is fed with the statistical parameter θ, not in logarithmic form, as the controlled variable, and generates the scaling factor c as the manipulated variable, whose value range comprises a finite number of discrete values $c_1, c_2, \ldots, c_N$. Furthermore, a lower threshold $\theta_1$ and an upper threshold $\theta_2$ are predetermined for the regulator 10. Ideally, the value of the statistical parameter θ should be within the range bounded by the lower threshold $\theta_1$ and the upper threshold $\theta_2$. If the statistical parameter θ exceeds the upper limit $\theta_2$, then the next higher discrete value is selected for the scaling factor c. If the statistical parameter θ falls below the lower limit $\theta_1$, then the scaling factor c is changed to the next lower discrete value.

I claim:

1. A device for scaling and quantization a plurality of digital soft output values from an equalizer, comprising a control loop for controlling a statistical parameter for the plurality of scaled and quantized soft output values, the control loop comprising:
    a calculation unit configured to calculate the statistical parameter, which is the bit error probability determined from a histogram;
    a control unit configured to calculate a single scaling factor for scaling the plurality of soft output values from the equalizer on the basis of the statistical parameter, said control unit comprising a integral regulator; and
    a scaling unit configured to scale the plurality of digital soft output values from the equalizer by the single scaling factor.

2. The device as in claim 1, further comprising a quantization unit configured to saturate the plurality of scaled soft output values.

3. The device as in claim 1, wherein the control unit is configured such that it regulates the statistical parameter at a predetermined value.

4. The device as claimed in claim 3, wherein the integral regulator is a proportional-integral regulator.

5. The device as in claim 1, wherein the calculation unit is configured such that it plots the plurality of scaled and quantized soft output values on a histogram, and uses this to calculate the statistical parameter.

6. The device as in claim 1, further comprising at least one calculation unit configured to convert the controlled variable to and from logarithmic form.

7. The device as claimed in claim 1, further comprising a quantization unit configured to quantize the scaling factor.

8. An EDGE radio receiver comprising a device as in claim 1.

9. The mobile radio receiver as claimed in claim 8, wherein the control unit takes account of the signal power received by the mobile radio receiver in the calculation of the scaling factor.

10. The mobile radio receiver as claimed in claim 8, wherein
    the mobile radio receiver has an converter configured to digitize the received signal, and has an amplifier, which is connected upstream of the converter, with a control loop, and
    the control unit takes account of the setting of the control loop for the amplifier in the calculation of the scaling factor.

11. A method for scaling and quantization a plurality of digital soft output values from an equalizer, comprising:
    scaling the plurality of digital soft output values from the equalizer by a single scaling factor;
    quantizing and saturating the plurality of scaled soft output values;
    calculating a statistical parameter for the plurality of scaled and quantized soft output values; and
    calculating the single scaling factor for the scaling of further soft output values from the equalizer on the basis of the statistical parameter being carried out by means of an integral regulator,
    wherein the statistical parameter is the bit error probability determined from a histogram.

12. The method as claimed in claim 11, wherein
    the scaling factor is calculated such that the statistical parameter is regulated at a predetermined value during the scaling and quantization of the further soft output values.

13. The method as claimed in claim 12, wherein
    the control process is carried out by means of an integral regulator or a proportional/integral regulator.

14. The method as claimed in claim 12, wherein the controlled variable and/or the manipulated variable are in logarithmic form for the control process.

15. The method as claimed in claim 11, wherein
    the plurality of scaled and quantized soft output values are plotted on a histogram, and
    the statistical parameter is calculated from the histogram.

16. The method as claimed in claim 11, wherein the scaling factor is quantized.

17. The method as claimed in claim 11, wherein the method is used in an EDGE radio receiver.

* * * * *